(12) United States Patent
Markwart et al.

(10) Patent No.: US 8,137,169 B2
(45) Date of Patent: Mar. 20, 2012

(54) ARRANGEMENT AND METHOD FOR UTILIZING THE HEAT OF WASTE AIR FOR HEATING THE BILGE AREA OF AIRCRAFT

(75) Inventors: Michael Markwart, Halstenbek (DE); Thomas Scherer, Hamburg (DE); Oliver Schaumann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/083,904

(22) Filed: Apr. 11, 2011

(65) Prior Publication Data

US 2011/0192565 A1    Aug. 11, 2011

Related U.S. Application Data

(62) Division of application No. 11/311,535, filed on Dec. 19, 2005, now Pat. No. 7,980,928.

(30) Foreign Application Priority Data

Dec. 21, 2004 (DE) .......................... 10 2004 061 372

(51) Int. Cl.
*B64D 13/00* (2006.01)
*B64D 11/00* (2006.01)
*B60H 1/00* (2006.01)
(52) U.S. Cl. ...... 454/78; 454/77; 244/118.5; 237/12.3 A
(58) Field of Classification Search .............. 62/239; 165/42, 66, 71–75, 104.14, 104.34, 132; 165/210, 235; 244/118.5, 117 R, 58; 454/76, 454/77; 237/12.3 A, 12.3 B
See application file for complete search history.

(56) References Cited

U.S. PATENT DOCUMENTS 2,870,698 A * 1/1959 Best .............................. 454/71
(Continued)

FOREIGN PATENT DOCUMENTS

DE           43 20 302          12/1994
(Continued)

OTHER PUBLICATIONS

Notice of Allowance issued Mar. 15, 2011 for U.S. Appl. No. 11/311,535.

(Continued)

*Primary Examiner* — Steven B McAllister
*Assistant Examiner* — Frances H Kamps
(74) *Attorney, Agent, or Firm* — Ingrassia, Fisher & Lorenz, P.C.

(57) ABSTRACT

The present application describes an arrangement and a method for utilizing the heat of waste air for heating the bilge area of aircraft, wherein the bilge area is connected to a heat transfer unit via a first air supply pipe, through which a bilge air flow drawn in from the bilge area flows into the heat transfer unit, wherein the heat transfer unit comprises a second air supply pipe, through which a waste air heat flow to be cooled that is created at another location in the aircraft flows into the heat transfer unit in order to heat the drawn-in bilge air flow, wherein the heat transfer unit comprises a first air discharge pipe, through which the cooled waste air heat flow is discharged, and a second air discharge pipe with a bilge inlet section, and wherein at least a portion of the heated bilge flow is returned to the bilge area via the air discharge pipe and the bilge inlet section.

13 Claims, 4 Drawing Sheets

U.S. PATENT DOCUMENTS

| | | | | |
|---|---|---|---|---|
| 2,966,779 | A | | 1/1961 | Lintern et al. ............... 62/160 |
| 3,765,354 | A | * | 10/1973 | Gronroos ...................... 114/312 |
| 4,262,495 | A | | 4/1981 | Gupta et al. .................. 62/402 |
| 4,419,926 | A | * | 12/1983 | Cronin et al. .................. 454/74 |
| 4,616,696 | A | | 10/1986 | Brundrett et al. ............. 165/54 |
| 5,090,639 | A | | 2/1992 | Miller et al. ............. 244/118.1 |
| 5,193,610 | A | * | 3/1993 | Morissette et al. ............ 165/54 |
| 5,253,484 | A | | 10/1993 | Corman et al. ............... 62/239 |
| 5,482,229 | A | * | 1/1996 | Asshauer .................. 244/118.5 |
| 5,513,500 | A | | 5/1996 | Fischer et al. ................. 62/239 |
| 5,516,330 | A | * | 5/1996 | Dechow et al. ................ 454/74 |
| 5,545,084 | A | * | 8/1996 | Fischer et al. ................. 454/76 |
| 5,701,755 | A | * | 12/1997 | Severson et al. .............. 62/402 |
| 5,967,461 | A | * | 10/1999 | Farrington ................ 244/118.5 |
| 6,283,410 | B1 | * | 9/2001 | Thompson ..................... 244/59 |
| 6,299,525 | B1 | * | 10/2001 | Scheffler et al. ............... 454/76 |
| 6,306,032 | B1 | * | 10/2001 | Scheffler et al. ............... 454/71 |
| 6,634,597 | B2 | * | 10/2003 | Johnson et al. ........... 244/118.5 |
| 6,817,575 | B1 | * | 11/2004 | Munoz et al. ............. 244/118.5 |
| 2004/0195447 | A1 | * | 10/2004 | Claeys ....................... 244/118.5 |
| 2005/0051668 | A1 | | 3/2005 | Atkey et al. ............... 244/118.5 |
| 2006/0219842 | A1 | * | 10/2006 | Shell et al. ................. 244/118.5 |
| 2007/0120014 | A1 | | 5/2007 | Elmers et al. ............. 244/118.5 |
| 2007/0164158 | A1 | | 7/2007 | Buchholz et al. ............. 244/119 |
| 2009/0165878 | A1 | * | 7/2009 | Krakowski et al. ........... 137/896 |
| 2009/0221224 | A1 | * | 9/2009 | Centofante ...................... 454/76 |
| 2010/0101251 | A1 | * | 4/2010 | Kelnhofer ....................... 62/133 |
| 2010/0132920 | A1 | * | 6/2010 | Noriega et al. .......... 165/104.11 |

FOREIGN PATENT DOCUMENTS

| | | |
|---|---|---|
| DE | 43 20 320 | 12/1994 |
| DE | 4320320 A1 | 1/1995 |
| DE | 43 40 317 | 6/1995 |
| DE | 4340317 A1 | 6/1995 |
| DE | 197 33 934 | 7/1998 |
| DE | 19733934 C1 | 7/1998 |
| DE | 199 27 606 | 12/2000 |
| DE | 19927606 A1 | 12/2000 |

OTHER PUBLICATIONS

Office Action dated Aug. 2, 2010 for U.S. Appl. No. 11/311,535.

* cited by examiner ated bilge flow is compressed to the bilge pressure level# ARRANGEMENT AND METHOD FOR UTILIZING THE HEAT OF WASTE AIR FOR HEATING THE BILGE AREA OF AIRCRAFT

REFERENCE TO RELATED APPLICATIONS

This application is a division of U.S. patent application Ser. No. 11/311,535, filed Dec. 19, 2005, which claims the benefit of the filing date of German Patent Application No. DE 10 2004 061 372.9, filed Dec. 21, 2004, the disclosures of which are hereby incorporated by reference.

FIELD OF THE INVENTION

The present invention relates to an arrangement and a method for utilizing heat of waste air for heating a bilge area of aircraft.

TECHNOLOGICAL BACKGROUND

Due to its location and geometry, the bilge area of aircraft serves as the destination for waste air with higher levels of, for example, waste heat, aromatics or smoke and as a collecting tank for accumulating liquids. For example, the waste water from drains, oil, grease, cleaning agents and condensate forming on the structure or in the insulating materials during temperature changes are accumulated in the bilge area. In order to prevent corrosion, the bilge area is only thermally insulated to a limited degree.

This means that a correspondingly higher expenditure is required for the thermal insulation of areas that lie directly adjacent to the bilge area, e.g., cargo compartments and underfloor areas.

The bilge area of aircraft usually contains pressure control valves for ensuring that the more polluted air accumulating in this area is permanently discharged from the aircraft fuselage. If the air quantity introduced into the bilge area during the various operating states on the ground and in the air is exactly laid out, it is possible to prevent the air in the bilge area from being recirculated into the cabin.

In systems used so far, the additional heating of the bilge area with a hot air flow consequently is only possible as long as no recirculation takes place from the bilge area into the cargo compartments, underfloor areas or cabin areas. The air quantity that can be introduced into the bilge area is essentially defined by the air quantity being discharged from the aircraft fuselage by the pressure control valve.

SUMMARY OF THE INVENTION

An exemplary embodiment of the present invention is believed to provide for an improved, effective heating of the bilge area without recirculating the more polluted air from the bilge area such that the expenditure for the thermal insulation of the bilge area can be reduced.

It is believed that an arrangement of air supply and air discharge pipes may make it possible to effectively utilize any waste air heat flow available in the aircraft (e.g., recirculated cabin air, the hot air flow of the air-conditioning system of the aircraft, waste air from lavatories and galleys or waste air from the cooling of electric consumers) for heating air drawn in from the bilge area with the aid of a heat transfer unit. The drawn-in and thusly heated air is then at least partially returned to the bilge area, wherein the quantitative air balance in the bilge area is not negatively affected, i.e., the quantity of heated air returned to the bilge area is smaller than or equal to the air quantity drawn in from the bilge area. The heated air that is not returned into the bilge area can be directly discharged from the aircraft fuselage in the form of an undesirable waste heat air flow by means of a pressure control valve.

This may minimize the risk of recirculating air from the bilge area, e.g., into cargo compartments, underfloor areas or cabin areas, during the heating of the bilge area, and only a low expenditure is required for the thermal insulation of the bilge area. The solution according to the invention simultaneously provides improved comfort for underfloor areas and cargo compartments.

A heat exchanger or a refrigerating machine may serve as the heat transfer unit. When using a heat exchanger, the air drawn in from the bilge area is directly heated by the waste air heat flow. When using a refrigerating machine that, in particular, results in an improved cooling efficiency in the aircraft at high outside temperatures, the heating of the drawn-in air is realized indirectly because heat is initially extracted from the waste air heat flow.

According to an exemplary embodiment, the drawn-in and heated air is blown back into the bilge area in its entirety, wherein the quantitative air balance in the bilge area remains unchanged. If so required, it can also be determined how the heated air is distributed in and thusly heats the bilge area with the aid of a control valve.

According to another exemplary embodiment, the air drawn in from the bilge area is delivered to a turbine before it is admitted into the heat transfer unit such that electric and mechanical energy may be generated. In addition, the efficiency of the heat transfer unit may be improved because the air taken in by the turbine is cooled before it is admitted into the heat transfer unit. The heated bilge flow emerging from the heat transfer unit is compressed to the bilge pressure level with the aid of a downstream compressor. In order to prevent the turbine from icing up in this embodiment, the drawn-in air can be heated before it passes through the turbine by means of a heat source, e.g., the hot air flow of the air-conditioning system of the aircraft, such that the energy efficiency in the turbine may be improved.

According to another exemplary embodiment, the turbine is arranged downstream of the heat transfer unit such that the bilge flow is heated before it is expanded in the turbine. This embodiment makes it possible to extract more electric or mechanical energy, particularly if the primary objective consists of recovering electric or mechanical energy by discharging cabin waste air outboard. The increased yield is achieved due to the elevated turbine admission temperature in this case.

It may be practical to utilize the electric or mechanical energy recovered by the turbine for driving ventilators and/or the heat transfer unit.

It may also be advantageous that the cold in the bilge area can be utilized for cooling an air flow in a secondary circuit in accordance with the requirements for many areas in the aircraft.

BRIEF DESCRIPTION OF THE DRAWINGS

The invention is described in greater detail below with reference to several embodiments that are illustrated in the enclosed figures. Identical components are identified by the same reference numerals in these figures. The figures show.

DESCRIPTION OF PREFERRED EMBODIMENTS OF THE INVENTION

Figure 1:
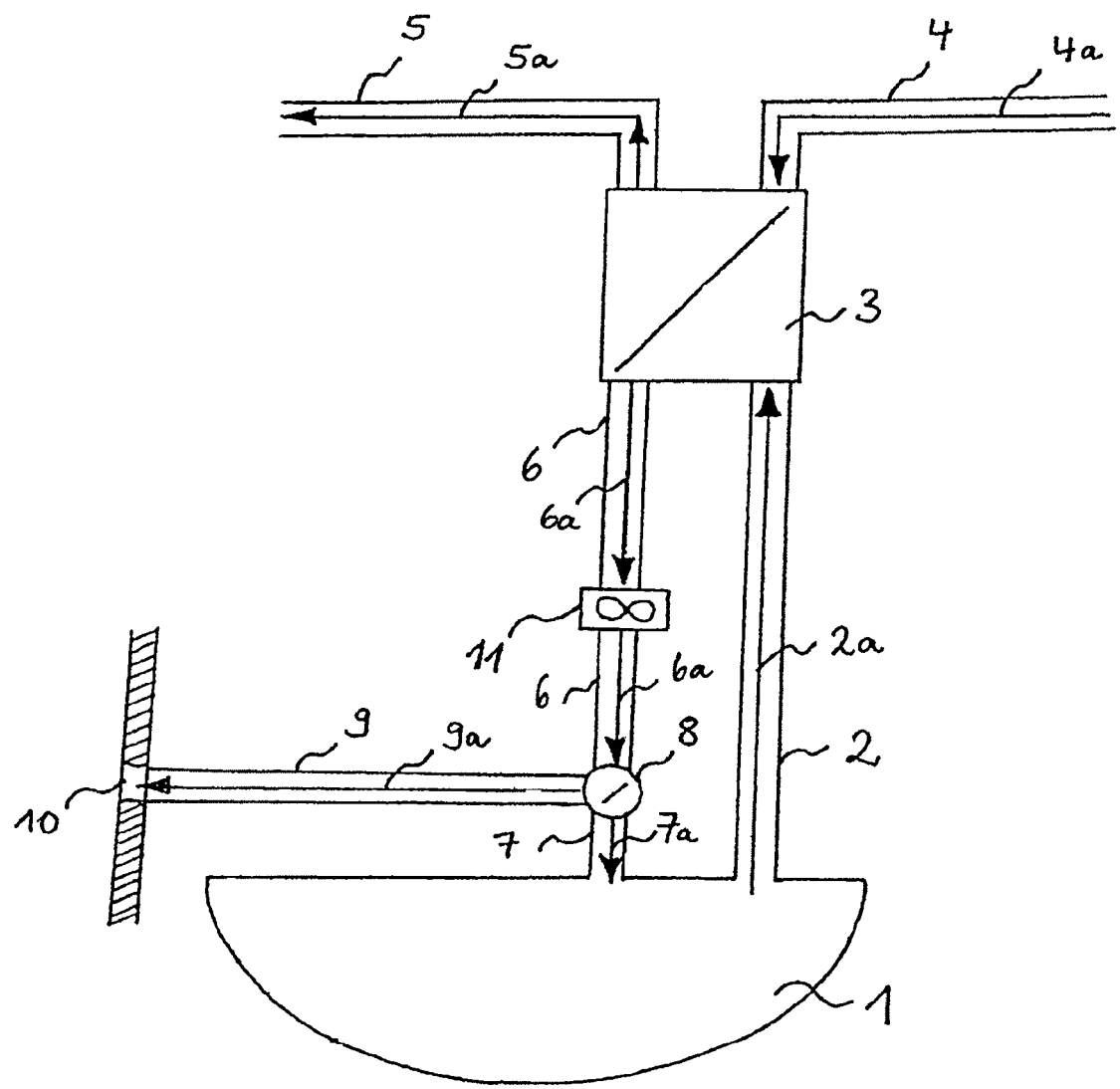
FIG. 1, a first exemplary embodiment of the arrangement according to the invention for utilizing the heat of waste air for heating the bilge area of aircraft.

FIG. 1 shows a schematic representation of a first arrangement for utilizing the heat of waste air for heating the bilge area of aircraft. In FIG. 1, the bilge area is identified by the reference numeral 1 and connected to a heat transfer unit 3 via a first air supply pipe 2. A bilge air flow 2a is drawn in from the bilge area 1 and flows into the heat transfer unit 3 via the first air supply pipe 2. The drawn-in bilge air flow 2a is heated in the heat transfer unit 3 by a waste air heat flow 4a to be cooled. The waste air heat flow 4a to be cooled may consist, for example, of recirculated cabin air, lavatory waste air, galley waste air, waste air from the cooling of electric consumers or the hot air flow of the air-conditioning system of the aircraft. This means that any heat flow created in the aircraft can be effectively utilized for heating the drawn-in bilge air flow 2a. The heating of the drawn-in bilge air flow 2a in the heat transfer unit 3 is either realized directly by means of a heat exchanger or indirectly by means of a refrigerating machine. The waste air heat flow 5a cooled in the heat transfer unit 3 and the heated bilge flow 6a are respectively discharged from the heat transfer unit 3 through a first air discharge pipe 5 and a second air discharge pipe 6, wherein a desired portion of the heated bilge flow 6a flows back into the bilge area 1 via the bilge inlet section 7 in the form of a bilge heating air flow 7a in order to heat the bilge area. For this purpose, a control valve 8 is arranged in the second air discharge pipe 6 and branches the second air discharge pipe 6 into the bilge inlet section 7 and an air discharge pipe 9. The portion of the heated bilge flow 6a that does not flow back into the bilge area 1 is directly discharged in a controllable fashion from the aircraft fuselage in the form of an undesirable waste air heat flow 9a by means of a pressure control valve 10. It is also possible to utilize any membrane valve or venturi valve instead of a pressure control valve.

In order to prevent the quantitative air balance within the bilge area 1 from being negatively influenced, i.e., to prevent waste air in the bilge area 1 from penetrating into other areas of the aircraft, the air quantity of the bilge heating air flow 7a introduced into the bilge area 1 via the bilge inlet section 7 is smaller than or equal to the air quantity of the bilge air flow 2a drawn in from the bilge area 1.

Naturally, the heated bilge air flow 6a may also be blown into the bilge area 1 in its entirety. If so required, it can also be determined how the bilge heating air flow 7a is distributed in and thusly heats the bilge area 1 with the aid of the control valve 8. In this case, the quantitative air balance in the bilge area 1 remains unchanged.

In the arrangement according to FIG. 1, a turbo engine 11 is also arranged in the second air discharge pipe 6 between the heat transfer unit 3 and the bilge inlet section 7, wherein this turbo engine draws in the cooled waste air heat flow 5a and the heated bilge flow 6a, compensates flow losses and maintains the flow process.

Alternatively, the bilge heating air flow 7a circulated in the bilge area 1 can be entirely or partially discharged outboard in order to limit the temperature within the bilge area 1 or to maintain a preset bilge temperature constant. If the bilge area 1 contains a (not-shown) cabin pressure control valve, the excess bilge heating air flow 7a can be delivered to the cabin pressure control valve in order to preferably dissipate the undesirable heat without affecting the quantitative air balance in the bilge area 1 or the cabin pressure control.

Figure 2:
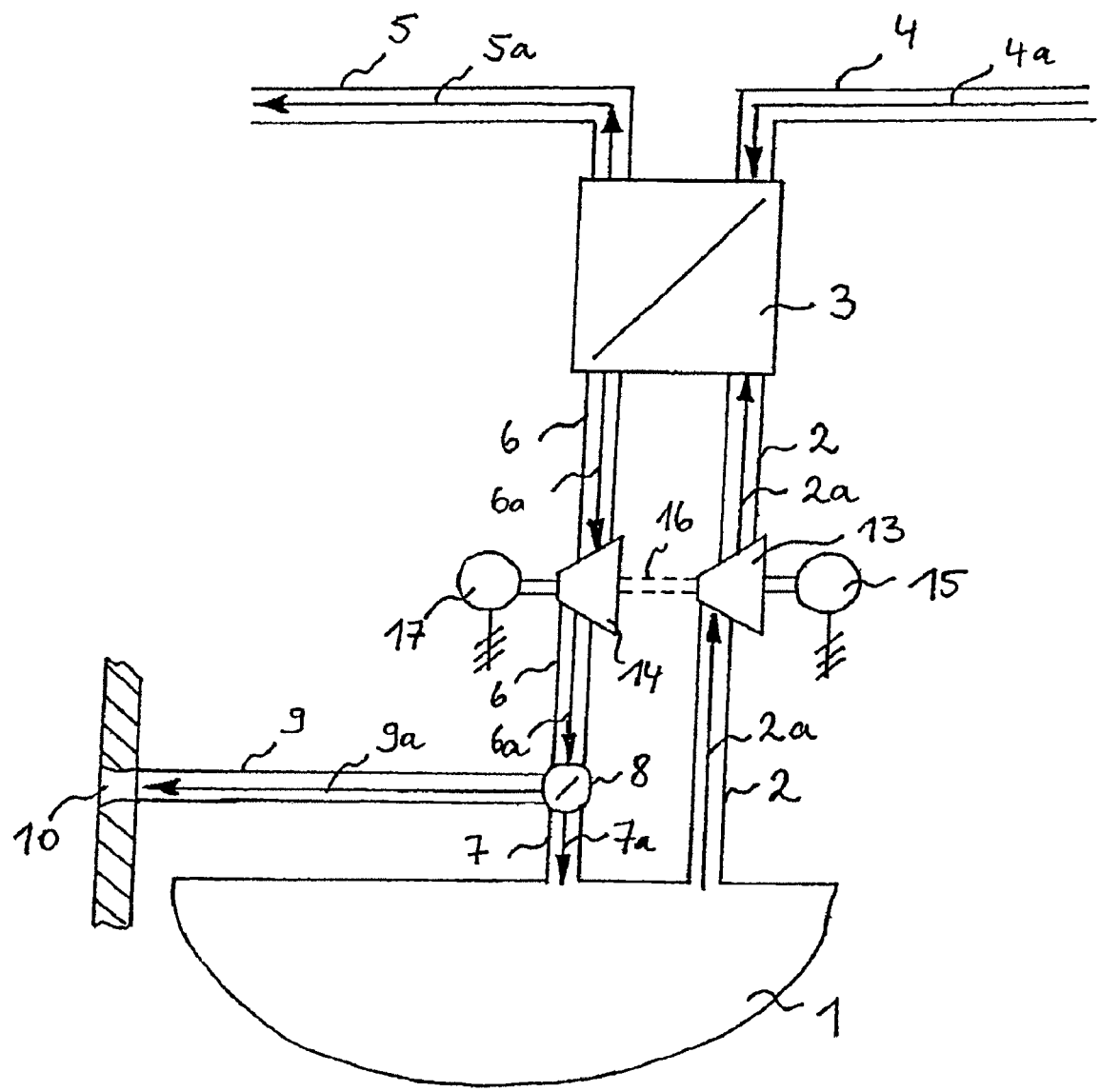
FIG. 2, a second exemplary embodiment of the arrangement according to the invention.

In contrast to the embodiment according to FIG. 1, a turbine 13 is arranged in the first air supply pipe 2 in the second embodiment that is schematically illustrated in FIG. 2, wherein this turbine draws in a bilge air flow 2a from the bilge area 1. An improved efficiency of the heat exchanger can be achieved in this case because the air is cooled upstream of the heat transfer unit 3 during its expansion in the turbine 13. The turbine 13 drives a generator 15 for generating electric energy or, alternatively, for powering the compressor 14 that is arranged in the second air discharge pipe 6 and connected to the turbine 13 via a shaft 16 that is drawn with broken lines in FIG. 2. The expanded and cooled bilge air flow 2a emerging from the turbine 13 flows into the heat transfer unit 3 via the first air supply pipe 2 and is heated therein by the waste air heat flow 4a to be cooled analogous to the embodiment shown in FIG. 1. In this case, the heating may also be realized directly by means of a heat exchanger or indirectly by means of a refrigerating machine. The cooled waste air heat flow 5a and the heated bilge flow 6a are respectively discharged from the heat transfer unit 3 via the first air discharge pipe 5 and the second air discharge pipe 6. The heated bilge flow 6a being discharged is additionally heated and compressed to the pressure level of the bilge area by the compressor 14 that is arranged in the second air discharge pipe 6 between the heat transfer unit 3 and the bilge inlet section 7. The compressor 14 is either driven by an electric motor 17 or part of the required driving power is delivered by the output shaft 16 of the turbine 13 as mentioned above. Beginning with the discharge from the compressor 14, the remainder of the description corresponds to that of the first embodiment (FIG. 1).

In order to prevent the turbine 13 from icing up, the drawn-in bilge air flow 2a may be alternatively heated by means of a (not-shown) heat source, e.g., the hot air flow of the air-conditioning system of the aircraft, before it passes through the turbine 13 such that the energy efficiency in the turbine is simultaneously improved.

Figure 3:
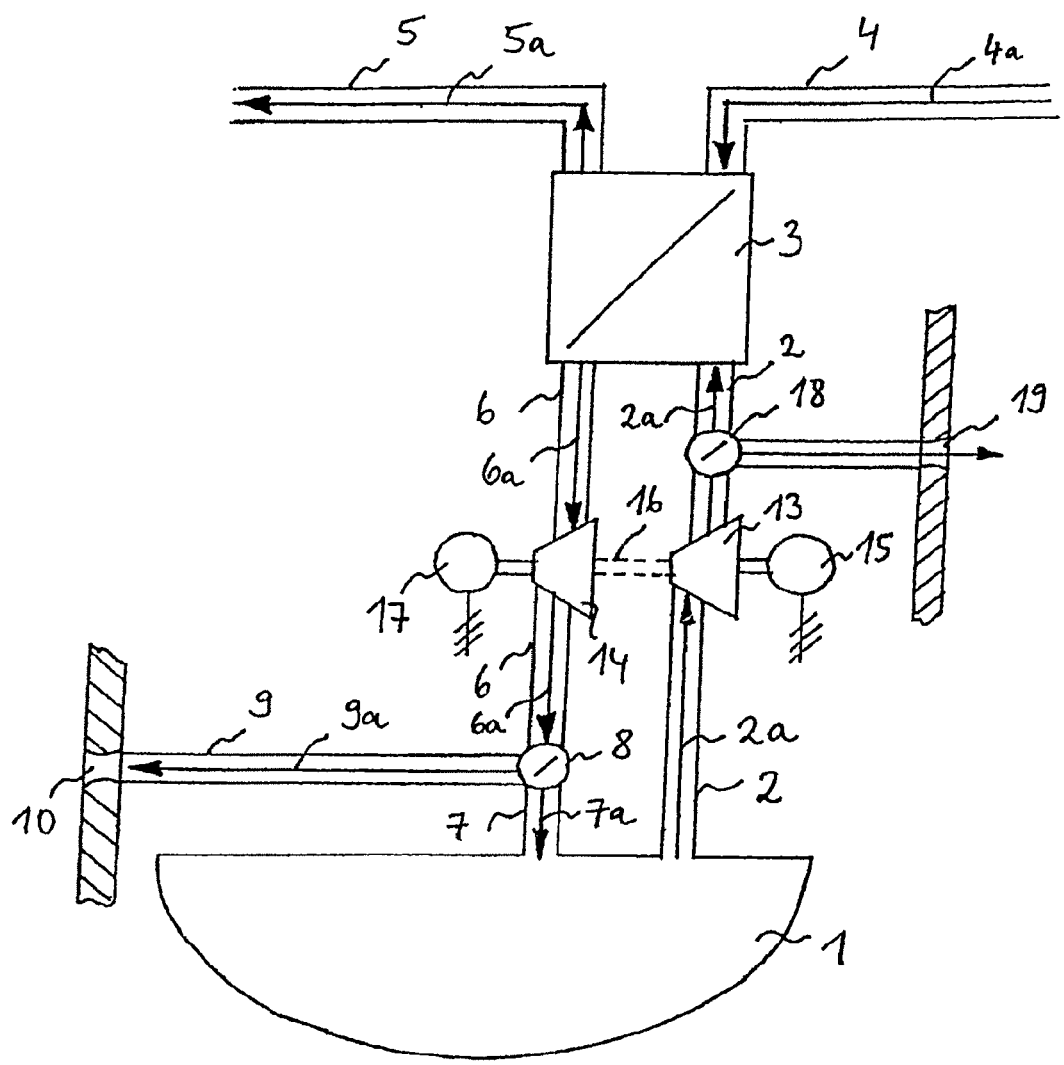
FIG. 3, a modification of the exemplary embodiment according to FIG. 2, and FIG. 4, a third exemplary embodiment of the arrangement according to the invention.

FIG. 3 shows a modification of the second embodiment according to FIG. 2 with an optional bilge temperature control. A control valve 18 is arranged in the first air supply pipe 2 between the turbine 13 and the heat transfer unit 3 for this purpose. This control valve 18 makes it possible to branch off at least a portion of the drawn-in bilge air flow 2a and to directly discharge this portion into the surroundings of the aircraft through a hole 19 in the skin. This is particularly advantageous at high outside temperatures on the ground or at low altitudes, at which the bilge area 1 does not have to be heated, but electric or mechanical energy should still be recovered.

Figure 4:
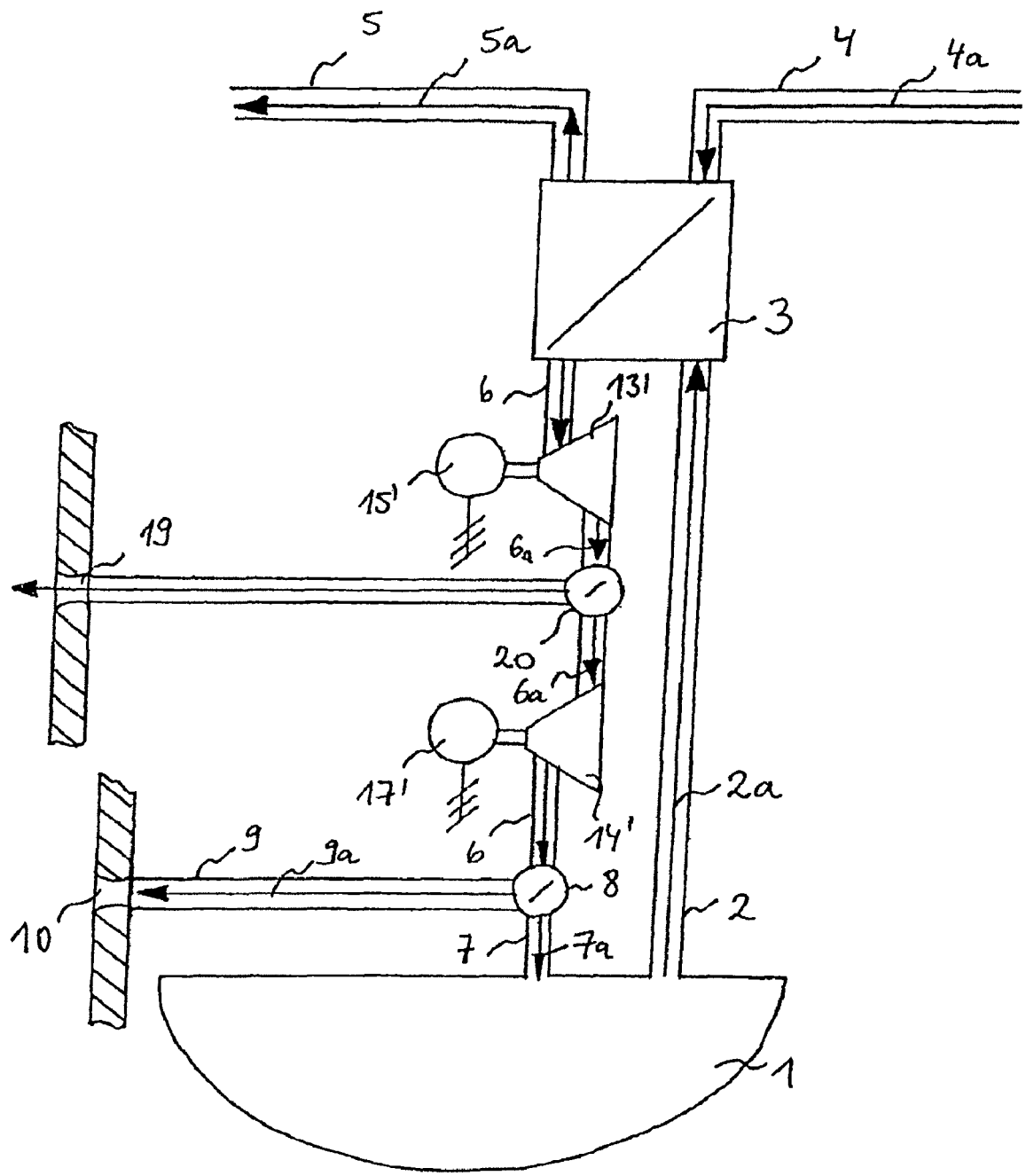

FIG. 4 shows a third embodiment, in which the drawn-in bilge air flow 2a flows into the heat transfer unit 3 via the first air supply pipe 2 analogous to the first embodiment (FIG. 1) and is heated therein by the waste air heat flow 4a to be cooled. Only the bilge flow 6a discharged through the second air discharge pipe 6 is expanded in the turbine 13'. The turbine 13' is connected to a generator 15' for generating electric energy analogous to the second embodiment (FIGS. 2, 3). After the discharge from the turbine, a portion of the bilge flow 6a emerging from the turbine 13' can be discharged into the surroundings of the aircraft in the form of cabin waste air through the opening 19 in the skin, namely under the control of the valve 20. This makes it possible to discharge a portion of the heated bilge flow 6a emerging from the heat transfer unit 3 outside the pressurized fuselage by means of the turbine 13' rather than to the bilge area 1, wherein this is particularly advantageous at high outside temperatures on the ground or at low altitudes, at which it is not necessary to heat the bilge, but heating energy should still be extracted.

The portion of the bilge flow 6a that emerges from the turbine 13' and is not discharged through the opening 19 in the skin by means of the valve 20 is delivered to a compressor 14' arranged in the second air discharge pipe 6 between the turbine 13' and the bilge inlet section 7. The compressor 14' additionally heats and compresses the forwarded portion of the bilge flow 6a to the bilge pressure level. Beginning with the discharge from the compressor 14', the remainder of the description again corresponds to that of the first embodiment (FIG. 1).

The mechanical or electric energy generated by the turbine 13 or 13' in the embodiments shown in FIGS. 2-4 can be advantageously utilized for driving required ventilators or the heat transfer unit 3 itself.

In comparison with the second embodiment (FIGS. 2, 3), the third embodiment (FIG. 4) provides the advantage of extracting more electrical power from the generator if the arrangement according to the invention should primarily serve for recovering electric energy by discharging turbine air outboard. The reason for this increased efficiency can be seen in the elevated turbine admission temperature.

What is claimed is:

1. An arrangement for utilizing heat of waste air for heating a bilge area of an aircraft, comprising
   a bilge area,
   a heat transfer unit connected to the bilge area via a first air supply pipe, through which a bilge air flow drawn in from the bilge area flows into the heat transfer unit,
   the heat transfer unit being further connected to a second air supply pipe, through which a waste air heat flow to be cooled and that is created at another location in the aircraft flows into the heat transfer unit in order to heat the drawn-in bilge air flow;
   the heat transfer unit being further connected to a first air discharge pipe, through which the cooled waste air heat flow is discharged, and a second air discharge pipe with a bilge inlet section, whereby at least a portion of the heated bilge flow is returned to the bilge area via the second air discharge pipe and the bilge inlet section;
   wherein the arrangement is configured to recover electrical or mechanical energy by cooling the heated bilge flow emerging from the heat transfer unit.

2. The arrangement of claim 1, further comprising a third air discharge pipe: and a control valve arranged in the second air discharge pipe to branch the second air discharge pipe into the bilge inlet section and the third air discharge pipe, through which a portion of the heated bilge flow that does not flow into the bilge area can be discharged out of the arrangement.

3. The arrangement of claim 1, further comprising an air quantity control configured to return an air quantity of the bilge flow into the bilge area which is smaller than or equal to the air quantity of the bilge air flow drawn in from the bilge area.

4. The arrangement of claim 1, wherein the heat transfer unit comprises a heat exchanger or a refrigerating machine.

5. The arrangement of claim 1, wherein the waste air heat flow to be cooled consists of at least one of recirculated cabin air, galley waste air, lavatory waste air, waste air from the cooling of electric consumers or a hot air flow of the air-conditioning system of the aircraft.

6. The arrangement of claim 1, further comprising a turbo engine arranged in the second air discharge pipe operable to draw in the cooled waste air heat flow and the heated bilge flow, to compensate flow losses and to maintain the flow process.

7. The arrangement of claim 1, further comprising:
   a turbine arranged in the first air supply pipe and configured to expand and cool the drawn-in bilge air flow, and
   a compressor arranged in the second air discharge pipe and configured to additionally heat and compress the heated bilge flow to the bilge pressure level.

8. The arrangement of claim 7, further comprising a generator connected to the turbine.

9. The arrangement of claim 7, further comprising a shaft connecting the turbine to the compressor.

10. The arrangement of claim 7, further comprising a control valve arranged in the first air supply pipe between the turbine and the heat transfer unit, and the control valve being configured such that at least a portion of the drawn-in bilge air flow can be discharged through an opening via the control valve.

11. The arrangement of claim 7, further comprising a hot air pipe connected to the first air supply pipe between the bilge area and the turbine, such that a hot air flow created at another location in the aircraft can be supplied via the hot air pipe in order to heat the drawn-in bilge air flow before it is admitted into the turbine.

12. The arrangement of claim 1, further comprising a turbine arranged in the second air discharge pipe and operable to expand and cool the heated bilge flow emerging from the heat transfer unit, and
   a compressor arranged in the second air discharge pipe between the turbine and the bilge inlet section and operable to heat and compress the bilge flow arriving from the turbine to the bilge pressure level.

13. The arrangement of claim 12, further comprising a control valve arranged in the second air discharge pipe between the turbine and the compressor and operable to discharge at least a portion of the bilge flow arriving from the turbine through an opening.

* * * * *